United States Patent
Tang

(10) Patent No.: US 11,785,471 B2
(45) Date of Patent: Oct. 10, 2023

(54) METHOD FOR TRANSMITTING INFORMATION AND RECEIVING INFORMATION AND COMMUNICATION DEVICE

(71) Applicant: GUANGDONG OPPO MOBILE TELECOMMUNICATIONS CORP., LTD., Guangdong (CN)

(72) Inventor: Hai Tang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 380 days.

(21) Appl. No.: 17/198,218

(22) Filed: Mar. 10, 2021

(65) Prior Publication Data
US 2021/0204142 A1 Jul. 1, 2021

Related U.S. Application Data

(63) Continuation of application No. PCT/CN2018/105023, filed on Sep. 11, 2018.

(51) Int. Cl.
*H04W 16/14* (2009.01)
*H04L 1/16* (2023.01)
(Continued)

(52) U.S. Cl.
CPC .......... *H04W 16/14* (2013.01); *H04L 1/1664* (2013.01); *H04L 1/1819* (2013.01);
(Continued)

(58) Field of Classification Search
CPC ... H04L 1/1854; H04L 1/1664; H04L 1/1896; H04L 1/1819; H04L 1/1864;
(Continued)

(56) References Cited

U.S. PATENT DOCUMENTS 10,863,487 B2 * 12/2020 Yan ...................... H04W 52/325
11,234,224 B2 * 1/2022 Takeda ............... H04W 72/1268
(Continued)

FOREIGN PATENT DOCUMENTS

CN 102986158 A 3/2013
CN 103796318 A 5/2014
(Continued)

OTHER PUBLICATIONS

The first Office Action of corresponding European application No. 18933273.7, dated Feb. 8, 2023.
(Continued)

*Primary Examiner* — Brian D Nguyen
(74) *Attorney, Agent, or Firm* — Ladas & Parry, LLP

(57) ABSTRACT

A method for transmitting information and receiving information and a communication device are provided. The method is applied to an unlicensed carrier, a first time unit on the unlicensed carrier is used to transmit target uplink control information, and a second time unit on the unlicensed carrier is used to transmit the target uplink shared channel. The second time unit is located after the first time unit in a time domain; and the method includes: a terminal device determines the target uplink control information and the target uplink shared channel; and the terminal device transmits the target uplink control information and the target uplink shared channel in the second time unit.

12 Claims, 5 Drawing Sheets

(51) Int. Cl.
  *H04L 1/18* (2023.01)
  *H04W 72/04* (2023.01)
  *H04L 1/1607* (2023.01)
  *H04L 1/1812* (2023.01)
  *H04L 1/1867* (2023.01)
  *H04W 72/0446* (2023.01)
  *H04W 72/0453* (2023.01)
  *H04W 72/21* (2023.01)

(52) U.S. Cl.
  CPC ....... *H04L 1/1896* (2013.01); *H04W 72/0446* (2013.01); *H04W 72/0453* (2013.01); *H04W 72/21* (2023.01)

(58) Field of Classification Search
  CPC . H04L 27/0006; H04L 5/0053; H04L 5/0044; H04L 1/1671; H04L 1/1822; H04W 16/14; H04W 72/0453; H04W 72/0446; H04W 72/21
  See application file for complete search history.

(56) References Cited

U.S. PATENT DOCUMENTS

| | | | |
|---|---|---|---|
| 11,601,160 B2 * | 3/2023 | Matsumura | H04W 72/0446 |
| 2017/0373741 A1 | 12/2017 | Yang et al. | |
| 2020/0344756 A1 * | 10/2020 | Lee | H04W 72/20 |
| 2021/0250142 A1 * | 8/2021 | Wang | H04L 5/0053 |
| 2023/0156714 A1 * | 5/2023 | Marinier | H04L 5/0092 370/330 |

FOREIGN PATENT DOCUMENTS

| | | |
|---|---|---|
| EP | 3280205 A1 | 2/2018 |
| KR | 20170127634 A | 11/2017 |
| WO | 2017099860 A1 | 6/2017 |
| WO | 2017126658 A1 | 7/2017 |
| WO | 2017171325 A1 | 10/2017 |
| WO | 2018145126 A2 | 8/2018 |

OTHER PUBLICATIONS

The international search report of PCT application No. PCT/CN2018/105023, dated Jan. 30, 2019.

The Written Opinion of PCT application No. PCT/CN2018/105023, dated Jan. 30, 2019.

Hua Wei et al. "3GPP TSG RANWGI Meeting #94, RI-1808063" HARQ Enhancements in NR Unlicensed, Aug. 10, 2018 (Aug. 10, 2018).

The EESR of corresponding European application No. 18933273.7, dated Sep. 9, 2021.

* cited by examiner

METHOD FOR TRANSMITTING INFORMATION AND RECEIVING INFORMATION AND COMMUNICATION DEVICE

CROSS-REFERENCE TO RELATED APPLICATIONS

This application is a continuation of International Application No. PCT/CN2018/105023, filed on Sep. 11, 2018, which is hereby incorporated by reference in its entirety.

TECHNICAL FIELD

Embodiments of the present application relate to the field of communications and, in particular, to a method for transmitting information and receiving information and a communication device.

BACKGROUND

Unlicensed spectrum is a spectrum that can be used for radio device communication divided by countries and regions. The spectrum is generally considered to be a shared spectrum, that is, communication devices in different communication systems can use the spectrum as long as they meet regulatory requirements set by the countries or the regions on the spectrum, and there is no need to apply for a proprietary spectrum authorization from governments. For example, in some areas, the communication device follows a principle of "Listen Before Talk", that is, the communication device needs to perform channel detection before transmitting a signal on a channel of the unlicensed spectrum. Only when the channel detection result is that the channel is idle, the communication device performs signal transmission. If the channel detection result of the communication device on the channel of the unlicensed spectrum is that the channel is busy, the communication device cannot perform signal transmission. With the development of wireless communication technology, both the long term evolution (LTE) system and the new radio (NR) system will consider deploying networks on unlicensed spectrum to use unlicensed spectrum for perform data service transmission.

In the NR system where the networks are deployed on the unlicensed spectrum (New Radio-based access to unlicensed spectrum, NR-U), since the terminal device may need to detect the channel on the unlicensed spectrum through channel detection before sending the physical uplink control channel (Physical Uplink Control Channel, PUCCH). The PUCCH can be sent when the channel is idle, otherwise it cannot be sent. When the control information transmitted in the PUCCH channel is hybrid automatic repeat request acknowledgement (Hybrid Automatic Repeat Request ACK, HARQ-ACK), if the PUCCH cannot be sent due to a failure of the channel detection, it will have a greater impact on delay/performance of an entire link.

Therefore, in the NR-U system, it is necessary to increase a transmission opportunity of the HARQ-ACK to ensure the delay and the performance of the entire communication link.

SUMMARY

A method for transmitting information and receiving information and a communication device are provided, which can increase the transmission opportunity of uplink control information such as HARQ-ACK information, thereby ensuring delay and performance of an entire communication link.

In a first aspect, a method for transmitting information is provided, which is applied to an unlicensed carrier, where a first time unit on the unlicensed carrier is used to transmit target uplink control information, and a second time unit on the unlicensed carrier is used to transmit a target uplink shared channel, and the second time unit is located after the first time unit in a time domain; and the method includes:
  determining, by a terminal device, the target uplink control information and the target uplink shared channel; and
  transmitting, by the terminal device, the target uplink control information and the target uplink shared channel in the second time unit.

In some possible implementations, a channel used to piggyback the target uplink control information in the first time unit is a physical uplink control channel (PUCCH); or,
  the channel used to piggyback the target uplink control information in the first time unit is a scheduled physical uplink shared channel (PUSCH); or,
  the channel used to piggyback the target uplink control information in the first time unit is a pre-configured PUSCH.

In some possible implementations, the target uplink shared channel is a scheduled physical uplink shared channel (PUSCH), and/or, the target uplink shared channel is a pre-configured PUSCH.

In some possible implementations, before transmitting, by the terminal device, the target uplink control information and the target uplink shared channel in the second time unit, the method further includes:
  receiving, by the terminal device indication information sent by a network device, where the indication information is used to indicate that the terminal device can transmit the target uplink control information in the first time unit, and can transmit the target uplink shared channel in the second time unit.

In some possible implementations, the indication information is further used to indicate that the terminal device can transmit the target uplink control information in the second time unit.

In some possible implementations, the indication information is physical layer signaling, and/or, the indication information is higher layer signaling.

In some possible implementations, before the transmitting, by the terminal device, the target uplink control information and the target uplink shared channel in the second time unit, the terminal device has obtained a channel using right of the second time unit.

In some possible implementations, before the transmitting, by the terminal device, the target uplink control information and the target uplink shared channel in the second time unit, the terminal device has not obtained a channel using right of the first time unit.

In some possible implementations, before the transmitting, by the terminal device, the target uplink control information and the target uplink shared channel in the second time unit, the terminal device has obtained a channel using right of the first time unit.

In some possible implementations, the method further includes:
  transmitting, by the terminal device, the target uplink control information in the first time unit.

In some possible implementations, the target uplink control information includes hybrid automatic repeat request acknowledgement (HARQ-ACK) information.

In some possible implementations, the second time unit includes at least two time units, and the target uplink control information is located in a last time unit or a penultimate time unit of the at least two time units.

In some possible implementations, the first time unit and the second time unit are continuous in the time domain.

In some possible implementations, the target uplink control information is carried on the target uplink shared channel.

In some possible implementations, the transmitting, by the terminal device, the target uplink control information and the target uplink shared channel in the second time unit, including:

transmitting, by the terminal device, a first uplink control channel and the target uplink shared channel in the second time unit, wherein the target uplink control information is carried on the first uplink control channel.

In a second aspect, a method for transmitting information is provided, which is applied to an unlicensed carrier, where a first time unit on the unlicensed carrier is used to transmit target uplink control information, a second time unit on the unlicensed carrier is used to transmit a target uplink shared channel, and the second time unit is located after the first time unit in a time domain; and the method includes:
determining, by the terminal device, the target uplink control information and the target uplink shared channel;
transmitting, by the terminal device, the target uplink control information in the first time unit, and transmitting, by the terminal device, the target uplink shared channel in the second time unit, when obtaining channel using rights of the first time unit and the second time unit;
transmitting, by the terminal device, the target uplink control information and the target uplink shared channel in the second time unit when the terminal device does not obtain the channel using right of the first time unit and determines that the channel using right of the second time unit has been obtained.

In some possible implementations, the channel used to piggyback the target uplink control information in the first time unit is the physical uplink control channel (PUCCH); or, the channel used to piggyback the target uplink control information in the first time unit is a scheduled physical uplink shared channel (PUSCH); or, the channel used to piggyback the target uplink control information in the first time unit is a pre-configured PUSCH.

In some possible implementations, the target uplink shared channel is a scheduled physical uplink shared channel (PUSCH), and/or, the target uplink shared channel is a pre-configured PUSCH.

In some possible implementations, before the transmitting, by the terminal device, the target uplink control information and the target uplink shared channel in the second time unit, the method further includes:

receiving, by the terminal device, indication information sent by a network device, where the indication information is used to indicate that the terminal device can transmit the target uplink control information in the first time unit, and can transmit the target uplink shared channel in the second time unit.

In some possible implementations, the indication information is further used to indicate that the terminal device can transmit the target uplink control information in the second time unit.

In some possible implementations, the indication information is physical layer signaling, and/or, the indication information is higher layer signaling.

In some possible implementations, the target uplink control information includes hybrid automatic repeat request acknowledgement (HARQ-ACK) information.

In some possible implementations, the first time unit and the second time unit are continuous in the time domain.

In a third aspect, a method for receiving information is provided, which is applied to an unlicensed carrier, where a first time unit on the unlicensed carrier is used to receive target uplink control information, a second time unit on the unlicensed carrier is used to receive a target uplink shared channel, and the second time unit is located after the first time unit in a time domain; and the method includes:
receiving, by a network device, the target uplink control information and the target uplink shared channel sent by a terminal device in the second time unit.

In some possible implementations, the channel used to piggyback the target uplink control information in the first time unit is the physical uplink control channel (PUCCH); or, the channel used to piggyback the target uplink control information in the first time unit is a scheduled physical uplink shared channel (PUSCH); or, the channel used to piggyback the target uplink control information in the first time unit is a pre-configured PUSCH.

In some possible implementations, the target uplink shared channel is a scheduled physical uplink shared channel (PUSCH), and/or the target uplink shared channel is a pre-configured PUSCH.

In some possible implementations, before the receiving, by the network device, the target uplink control information and the target uplink shared channel sent by the terminal device in the second time unit, the method further includes:

sending, by the network device, indication information to the terminal device, where the indication information is used to indicate that the terminal device can transmit the target uplink control information in the first time unit, and can transmit the target uplink shared channel in the second time unit.

In some possible implementations, the indication information is further used to indicate that the terminal device can transmit the target uplink control information in the second time unit.

In some possible implementations, the indication information is physical layer signaling, and/or, the indication information is higher layer signaling In some possible implementations, the method further includes:

receiving, by the network device, the target uplink control information sent by the terminal device in the first time unit.

In some possible implementations, the target uplink control information includes hybrid automatic repeat request acknowledgement (HARQ-ACK) information.

In some possible implementations, the second time unit includes at least two time units, and the target uplink control information is located in a last time unit or a penultimate time unit of the at least two time units.

In some possible implementations, the first time unit and the second time unit are continuous in the time domain.

In some possible implementations, the target uplink control information is carried on the target uplink shared channel.

In some possible implementations, the receiving, by the network device, the target uplink control information and the target uplink shared channel sent by the terminal device in the second time unit includes:
   receiving, by the network device, a first uplink control channel and the target uplink shared channel sent by the terminal device in the second time unit, where the target uplink control information is carried on the first uplink control channel;

In a fourth aspect, a method for receiving information is provided, which is applied to an unlicensed carrier, where a first time unit on the unlicensed carrier is used to receive target uplink control information, a second time unit on the unlicensed carrier is used to receive a target uplink shared channel, and the second time unit is located after the first time unit in a time domain; and
   the method includes:
   determining, by a network device, whether there is the target uplink control information in the first time unit;
   receiving, by the network device, the target uplink control information in the first time unit, when determining that there is the target uplink control information in the first time unit;
   receiving, by the network device, the target uplink control information in the second time unit, when determining that there is no target uplink control information in the first time unit; and
   receiving, by the network device, the target uplink shared channel in the second time unit.

In some possible implementations, a channel used to piggyback the target uplink control information in the first time unit is the physical uplink control channel (PUCCH); or,
   the channel used to piggyback the target uplink control information in the first time unit is a scheduled physical uplink shared channel (PUSCH); or,
   the channel used to piggyback the target uplink control information in the first time unit is a pre-configured PUSCH.

In some possible implementations, the target uplink shared channel is a scheduled physical uplink shared channel (PUSCH), and/or the target uplink shared channel is a pre-configured PUSCH.

In some possible implementations, before the determining, by a network device, whether the target uplink control information exists in the first time unit, the method further includes:
   sending, by the network device, indication information to the terminal device, where the indication information is used to indicate that the terminal device can transmit the target uplink control information in the first time unit, and can transmit the target uplink shared channel in the second time unit.

In some possible implementations, the indication information is further used to indicate that the terminal device can transmit the target uplink control information in the second time unit.

In some possible implementations, the indication information is physical layer signaling, and/or the indication information is higher layer signaling.

In some possible implementations, the target uplink control information includes hybrid automatic repeat request acknowledgement (HARQ-ACK) information.

In some possible implementations, the first time unit and the second time unit are continuous in the time domain.

In a fifth aspect, a communication device is provided, which is configured to execute the method in any one of the above first to fourth aspects or the method in any one of the above possible implementations.

In some possible implementations, the communication device includes:
   a functional module used to execute the method of any one of the above first to fourth aspects or any one of the above possible implementations.

In some possible implementations, the communication device is a terminal device, and the terminal device is configured to execute the method in any one of the above first aspect to the second aspect or the method in any one of the above possible implementations.

In some possible implementations, the communication device is a network device, and the network device is configured to execute the method in any one of the foregoing third to fourth aspects or the method in any one of the above possible implementations.

In a sixth aspect, a communication device is provided, including:
   a processor, configured to call and run a computer program from a memory, and the computer program is configured to execute the method in any one of the above first aspect to the fourth aspect or the method in any one of the above possible implementations.

In some possible implementations, the communication device further includes:
   the memory, configured to store the computer program.

In some possible implementations, the communication device is a terminal device, and the terminal device is configured to execute the method in any one of the above first aspect to the second aspect or the method in any one of the foregoing possible implementations.

In some possible implementations, the communication device is a network device, and the network device is configured to execute the method in any one of the foregoing third aspect to fourth aspect or the method in any one of the above possible implementations.

In a seventh aspect, a chip is provided for executing the method in any one of the above first aspect to fourth aspect or the method in any one of the above possible implementations.

In some possible implementations, the chip further includes:
   a processor, configured to call and run a computer program from a memory, and the computer program is configured to execute the method in any one of the first aspect to the fourth aspect or the method in any one of the above possible implementations.

In some possible implementations, the chip further includes:
   the memory, configured to store the computer program.

In an eighth aspect, a computer-readable storage medium is provided, where the storage medium is used to store a computer program, and the computer program is used to execute the method of any one of the first aspect to fourth aspect or the method in any one of the above possible implementations.

In a ninth aspect, a computer program is provided, which includes computer program instructions, and the computer program is configured to execute the method in any one of the first aspect to fourth aspect or the method in any one of the above possible implementations.

In a tenth aspect, a computer program product is provided, which, when running on a computer, causes the computer to execute the method in any one of the first aspect to fourth aspect or the method in any one of the above possible implementations.

In an eleventh aspect, a communication system is provided, which includes a terminal device and a network device; where, the terminal device is configured to execute the method of any one of the above first aspect to the second aspect or the method in any one of the above possible implementations, and the network device is configured to execute the method in any one of the above third aspect to the fourth aspect or the method in any one of the above possible implementations.

Through the above solution, the terminal device transmits the target uplink control information that should be transmitted in the first time unit in the second time unit, the transmission opportunity of the target uplink control information can be increased, thereby ensuring delay and performance of an entire communication link.

Taking that terminal device is scheduled to transmit the physical uplink control channel (PUCCH) in the first time unit, and transmit physical uplink shared channel (PUSCH) in the second time unit on an unlicensed carrier as an example. The terminal device can piggyback the uplink control information (for example, HARQ-ACK information) included in the PUCCH to the PUSCH, that is, providing the uplink control information multiple transmission opportunities, so that the terminal device can transmit the uplink control information included in the PUCCH on the subsequent PUSCH resource with a certain probability without obtaining the PUCCH transmission opportunity, thereby ensuring the delay and the performance of the entire communication link.

DESCRIPTION OF EMBODIMENTS

The technical solutions in the embodiments of the present application will be described below with reference to the drawings in the embodiments of the present application. Obviously, the described embodiments are a part of the embodiments of the present application, not all of the embodiments. Based on the embodiments in the present application, all other embodiments obtained by those of ordinary skilled in the art without creative work shall fall within the protection scope of the present application.

The technical solutions of the embodiments of the present application can be applied to each communication system, such as: global system of mobile communication (Global System of Mobile communication, GSM), code division multiple access (Code Division Multiple Access, CDMA) system, and wideband code division multiple access (Wideband Code Division Multiple Access, WCDMA) system, general packet radio service (General Packet Radio Service, GPRS), long term evolution (Long Term Evolution, LTE) system, LTE frequency division duplex (Frequency Division Duplex, FDD) system, LTE time division Duplex (Time Division Duplex, TDD) system, advanced long term evolution (Advanced Long Term Evolution, LTE-A) system, new radio (New Radio, NR) system, NR system evolution system, LTE-based access to unlicensed spectrum (LTE-based access to unlicensed spectrum, LTE-U) system, NR-based access to unlicensed spectrum (NR-based access to unlicensed spectrum, NR-U) system, universal mobile telecommunication system (Universal Mobile Telecommunication System, UMTS), worldwide interoperability for microwave access (Worldwide Interoperability for Microwave Access, WiMAX) Communication system, wireless local area network (Wireless Local Area Network, WLAN), wireless fidelity (Wireless Fidelity, WiFi), next-generation communication system or other communication systems, etc.

Generally speaking, traditional communication systems support a limited number of connections and are easy to implement. However, with the development of communication technology, mobile communication systems will not only support traditional communication, but also support, for example, device to device (Device to Device, D2D) communication, machine to machine (Machine to Machine, M2M) communication, machine type communication (Machine Type Communication, MTC), and vehicle to vehicle (Vehicle to Vehicle, V2V) communication, etc. The embodiments of the present application can also be applied to these communications systems.

In some possible implementations, the communication systems in the embodiments of the present application can be applied to a carrier aggregation (Carrier Aggregation, CA) scenario, can also be applied to a dual connectivity (Dual Connectivity, DC) scenario, and can further be applied to a standalone (Standalone, SA) network scene.

Figure 1:
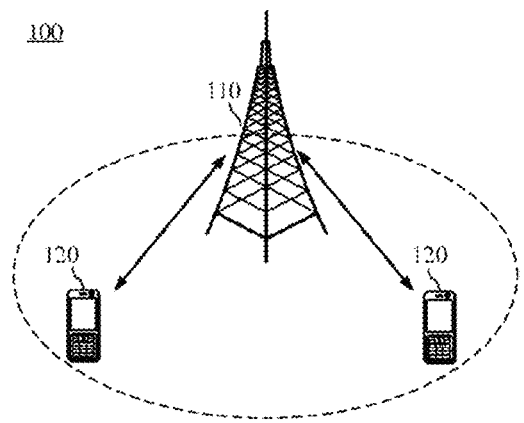
FIG. 1 is an example diagram of an application scenario according to the present application.

Exemplarily, the communication system 100 applied in the embodiment of the present application is shown in FIG. 1. The wireless communication system 100 may include a network device 110. The network device 110 may be a device that communicates with terminal devices. The network device 110 may provide communication coverage for a specific geographic area, and may communicate with the terminal devices located in the coverage area. In some possible implementations, the network device 100 may be a base station (Base Transceiver Station, BTS) in a GSM system or a CDMA system, or may also be a base station (NodeB, NB) in a WCDMA system, or may further be an evolutional base station (Evolutional Node B, eNB or eNodeB) in an LTE system, or is a network-side device in the NR system, or is a wireless controller in the cloud radio access network (Cloud Radio Access Network, CRAN), or, the network device may be a relay station, an access point, a vehicle-mounted device, a wearable device, a network-side device in a next-generation network, or a network device in a public land mobile network (Public Land Mobile Network, PLMN) that will evolve in the future.

The wireless communication system 100 also includes at least one terminal device 120 located within the coverage area of the network device 110. The terminal device 120 may be mobile or fixed. In some possible implementations, the terminal device 120 may refer to an access terminal, a user device (User Equipment, UE), a user unit, a user station, a mobile station, a mobile set, a remote station, a remote terminal, a mobile device, a user terminal, a terminal, a wireless communication device, a user agent or a user apparatus. The access terminal can be a cellular phone, a cordless phone, a session initiation protocol (Session Initiation Protocol, SIP) phone, a wireless local loop (Wireless Local Loop, WLL) station, a personal digital assistant (Personal Digital Assistant, PDA), a handheld device with wireless communication functional, a computing device or other processing devices connected to wireless modems, an in-vehicle device, a wearable device, a terminal device in the future 5G network or a terminal device in the future evolved PLMN, etc. Where, in some possible implementations, device to device (Device to Device, D2D) communication may also be performed between the terminal devices 120.

Specifically, the network device 110 may provide services for a cell, and the terminal device 120 communicates with the network device 110 through transmission resources (for example, frequency domain resources, or spectrum resources) used by the cell. The cell may be a cell corresponding to the network device 110 (for example, a base station). The cell may belong to a macro base station or a base station corresponding to a small cell. The small cell here may include: a metro cell (Metro cell), micro cell (Micro cell), pico cell (Pico cell), femto cell (Femto cell), etc. These small cells have the characteristics of small coverage and low transmit power, which suitable for providing high-speed data transmission services.

FIG. 1 exemplarily shows one network device and two terminal devices. In some possible implementations, the wireless communication system 100 may include multiple network devices and the coverage of each network device may include other numbers of terminal devices, which is not limited in the embodiment of the present application.

In some possible implementations, the wireless communication system 100 may also include other network entities such as a network controller and a mobility management entity, which are not limited in the embodiment of the present application.

It should be understood that the devices with a communication function in the network/system in the embodiments of the present application may be referred to as communication devices. Taking the communication system 100 shown in FIG. 1 as an example, the communication device may include a network device 110 and terminal devices 120 with communication functions. The network device 110 and the terminal devices 120 may be the specific devices described above, which will not be repeated here. The communication device may also include other devices in the communication system 100, such as a network controller, a mobility management entity, and other network entities, which are not limited in the embodiment of the present application.

Figure 2:
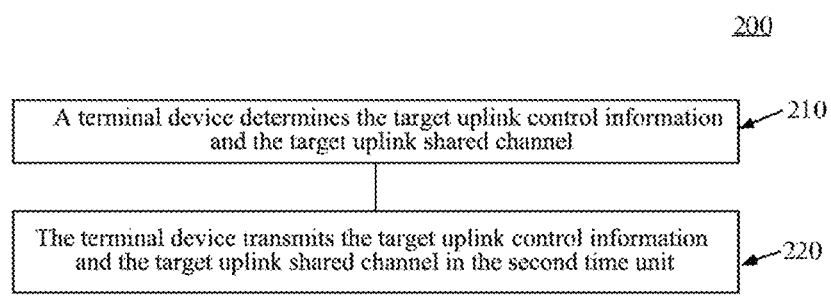
FIG. 2 is a schematic flowchart of a method for transmitting information according to an embodiment of the present application.

FIG. 2 shows a schematic flowchart of a method 200 for transmitting information by a terminal device according to an embodiment of the present application. The method 200 can be applied to an unlicensed carrier, and a first time unit on the unlicensed carrier is used to transmit the target uplink control information, a second time unit on the unlicensed carrier is used to transmit the target uplink shared channel, and the second time unit is located after the first time unit in the time domain. The method 200 may be executed by a terminal device, for example, which may be a terminal device as shown in FIG. 1.

As shown in FIG. 2, the method 200 includes some or all of the following contents:

a first aspect, a method of transmitting information is provided; and the method includes:

210, a terminal device determines the target uplink control information and the target uplink shared channel; and 220, the terminal device transmits the target uplink control information and the target uplink shared channel in the second time unit.

In some embodiments of the present application, the channel used to piggyback the target uplink control information in the first time unit is at least one of the following channels:

a physical uplink control channel (Physical Uplink Control Channel, PUCCH), scheduled physical uplink shared channel (Physical Uplink Shared Channel, PUSCH), and pre-configured PUSCH.

It should be understood that the time unit in the embodiment of the present application may refer to one or more time slots, may also refer to one or more subframes, or may further refer to one or more mini-slots, etc., which is not limited in the present application.

It should be understood that the terminal device transmits the target uplink control information and the target uplink shared channel in the second time unit may mean that the terminal device transmits the target uplink control information and the target uplink shared channel through all the time resources in the second time unit. It may also mean that the terminal device transmits the target uplink control information and the target uplink shared channel through the partial time resources in the second time unit, which is not limited in the present application.

In some possible implementations, the scheduled PUSCH means that the terminal device receives uplink grant (UL grant) information sent by the network device, and determines information such as time domain resources and frequency domain resources for transmitting the PUSCH according to the uplink grant information. In other words, the resources used by the scheduled PUSCH can be considered to be dynamically allocated by the network device to the terminal device.

In some possible implementations, the pre-configured PUSCH means that the terminal device receives radio resource control RRC information sent by the network device, and determines information such as time domain resources and frequency domain resources for transmitting the PUSCH according to the RRC information. In other words, the resources used by the pre-configured PUSCH can be considered to be allocated by the network device to the terminal device in advance.

In some possible implementations, the pre-configured PUSCH means that the terminal device receives radio resource control RRC information sent by the network device, and determines information such as frequency domain resources used to transmit the PUSCH according to the RRC information. The terminal device also receives dynamic scheduling information (for example, an uplink grant) sent by the network device, where the dynamic scheduling information is used to activate or deactivate the pre-configured frequency domain resource used for transmitting PUSCH. In other words, the resources used by the pre-configured PUSCH can also be considered to be allocated by the network device to the terminal device in advance and need to use dynamic signaling to activate or deactivate the pre-configured resources.

For example, the channel used to piggyback the target uplink control information in the first time unit is PUCCH.

For another example, the channel used to piggyback the target uplink control information in the first time unit is a scheduled PUSCH.

For yet another example, the channel used to piggyback the target uplink control information in the first time unit is a pre-configured PUSCH.

In some embodiments of the present application, the target uplink shared channel is a scheduled PUSCH, and/or, the target uplink shared channel is a pre-configured PUSCH.

As an example and not a limitation, taking that the channel used to piggyback the target uplink control information in the first time unit is PUCCH, and the channel used to piggyback the target uplink control information in the second time unit is PUSCH as an example. It can be found that when the terminal device transmits PUCCH and PUSCH on an unlicensed carrier, it can piggyback the uplink control information to be transmitted in the PUCCH (which may be all or part of the uplink control information, for example, HARQ-ACK information) to the PUSCH, that is, the uplink control information (for example, HARQ-ACK information) is enabled to have multiple transmission opportunities. Therefore, the terminal device can transmit the HARQ-ACK information included in the PUCCH on the subsequent PUSCH resource with a certain probability without obtaining the PUCCH transmission opportunity, thereby ensuring the delay and the performance of the entire communication link.

As an example and not a limitation, taking that the channel used to piggyback the target uplink control information in the first time unit is PUCCH, and the channel used to piggyback the target uplink control information in the second time unit is PUSCH as an example. It can be found that when the terminal device transmits multiple PUSCHs on an unlicensed carrier, the same uplink control information (for example, HARQ-ACK information) can be transmitted in the multiple PUSCHs, that is, the uplink control information (for example, HARQ-ACK information) has multiple transmission opportunities, so that the terminal device can transmit the HARQ-ACK information on subsequent PUSCH resources with a certain opportunity without obtaining the previous PUSCH transmission, thereby ensuring the delay and the performance of the entire communication link.

It should be understood that the embodiments of the present application do not specifically limit the type of the channel used to piggyback the target uplink control information in the first time unit and the type of the channel used to piggyback the target uplink control information in the second time unit.

For example, the channel used to piggyback the target uplink control information in the second time unit may also be a scheduled PUSCH.

For another example, the channel used to piggyback the target uplink control information in the second time unit may also be a pre-configured PUSCH.

For another example, the channel used to piggyback the target uplink control information in the second time unit may also be a PUCCH.

As an example and not a limitation, taking that the channel used to piggyback the target uplink control information in the first time unit is PUSCH, and the channel used to piggyback the target uplink control information in the second time unit is PUCCH as an example. It can be found that when the terminal device transmits the PUSCH and PUCCH on It can be found that when the terminal device transmits PUSCH and PUCCH on an unlicensed carrier, the uplink control information to be transmitted in the PUSCH (which can be all or part of the uplink control information, such as HARQ-ACK information) can also be transmitted through the subsequent PUCCH, that is, the uplink control information (for example, HARQ-ACK information) is enabled to have multiple transmission opportunities. Therefore, the terminal device can transmit the HARQ-ACK information included in the PUSCH on the subsequent PUCCH resource with a certain probability without obtaining the PUSCH transmission opportunity, thereby ensuring the delay and the performance of the entire communication link.

In some embodiments of the present application, the target uplink control information includes hybrid automatic repeat request acknowledgement (Hybrid Automatic Repeat Request ACK, HARQ-ACK) information. For example, the HARQ-ACK information corresponding to the physical downlink shared channel (Physical Downlink Shared Channel, PDSCH).

In some embodiments of the present application, the target uplink control information includes at least one of HARQ-ACK information, channel state information (Channel State Information, CSI), and scheduling request (Scheduling request, SR) information. Where, the channel state information includes at least one of rank indication (Rank Indication, RI) and precoding matrix indicator (Precoding Matrix Indicator, PMI) and a channel quality indicator (Channel Quality Indicator, CQI).

It should be understood that the embodiment of the present application only uses the above uplink control information as an example, and the embodiment of the present application is not limited to this. For example, the uplink control information in the embodiment of the present application may also include HARQ process identification ID, terminal device ID, uplink assignment index (Uplink assignment index, UAI), etc.

In some possible implementations, the terminal device transmitting the target uplink control information in the second time unit may be that the terminal device transmits all the information of the target uplink control information in the second time unit, and may also be that the terminal device transmits part information of the target uplink control information in the second time unit, which is not limited in the present application.

In some possible implementations, since the embodiment of the present application mainly provides multiple transmission opportunities in the time domain for the target uplink control information, when the target uplink control information includes multiple types of uplink control information, the multiple transmission opportunities may only be provided to the uplink control information with higher priority in the target uplink control information. For example, the target uplink control information includes first uplink control information and second uplink control information. A priority of the first uplink control information is higher than that of the second uplink control information. The terminal device may transmit the first uplink control information and the second uplink control information in the first time unit, and transmit the first uplink control information, rather than transmitting the second uplink control information in the second time unit.

In some possible implementations, the HARQ-ACK information in the uplink control information has a higher priority than the CSI. In some possible implementations, the priority of the scheduling request information in the uplink control information is higher than the CSI. In some possible implementations, the priority of the HARQ-ACK information corresponding to the PDSCH firstly transmitted in the uplink control information is higher than that of the HARQ-ACK information corresponding to the PDSCH transmitted later.

In some possible implementations, the second time unit includes at least two time units, and the target uplink control information is located in the last time unit or the penultimate time unit of the at least two time units.

In some embodiments of the present application, the first time unit and the second time unit are continuous in the time domain.

In some embodiments of the present application, the first time unit and the second time unit are not continuous in the time domain.

In some embodiments of the present application, before the terminal device transmits the target uplink control information and the target uplink shared channel in the second time unit, the terminal device receives indication information sent by a network device, where the indication information is used to indicate that the terminal device can transmit the target uplink control information in the first time unit, and can transmit the target uplink shared channel in the second time unit.

In some embodiments of the present application, the indication information is further used to indicate that the terminal device can transmit the target uplink control information in the second time unit.

In some embodiments of the present application, the indication information is physical layer signaling, and/or, the indication information is higher layer signaling.

It should be understood that the indication information may be a explicit indication or an implicit indication, and it may be a direct indication or an indirect indication, which are not limited in the present application.

For example, the indication information is used to indicate that the terminal device can transmit the target uplink control information in the second time unit, and it may be: the indication information is used to indicate that the terminal device can transmit an uplink control channel in the second time unit, and the content transmitted in the uplink control channel includes the target uplink control information.

It should be understood that the embodiment of the present application does not limit the specific form of the indication information. For example, the indication information may include at least one piece of information.

For example, the indication information includes first information and second information, and the first information is physical layer signaling (for example, downlink control information), which is used to indicate that the terminal device can transmit the target uplink control information in the first time unit, and can transmit the target uplink shared channel in the second time unit. The second information is high-level signaling (for example, RRC information or media access control MAC information), which is used to indicate that the terminal device can transmit the target uplink control information in the second time unit.

For another example, the indication information includes first information and second information, where the first information is used to indicate that the terminal device can transmit the target uplink control information in the first time unit and the second time unit, and the second information is used to indicate that the terminal device can transmit the target uplink shared channel in the second time unit. Where, the first information may be physical layer signaling or high layer signaling, and the second information may also be physical layer signaling or high layer signaling.

In some embodiments of the present application, before the terminal device transmits the target uplink control information and the target uplink shared channel in the second time unit, the terminal device has obtained the channel using right of the second time unit.

It should be understood that the terminal device has obtained the channel using right of the second time unit, which may be that the terminal device performs channel detection before the second time unit to obtain the channel using right and may also be that the terminal device has obtained the channel using right of the third time unit and the third time unit and the second time unit are continuous in the time domain, or the second time unit does not need to perform channel detection, or other cases, which is not limited in the present application. It should also be understood that the situation in which the terminal device obtains the channel using right of other time units is similar to the situation in which the channel using right of the second time unit is obtained, and will not be repeated.

In some embodiments of the present application, before the terminal device transmits the target uplink control information and the target uplink shared channel in the second time unit, the terminal device has obtained the channel using right in the first time unit.

In some embodiments of the present application, the method further includes:

the terminal device transmits the target uplink control information in the first time unit.

In some embodiments of the present application, the terminal device transmits the target uplink control information and the target uplink shared channel in the second time unit includes:

the terminal device transmits the target uplink shared channel in the second time unit, where the target uplink control information is carried on the target uplink shared channel.

In some embodiments of the present application, the terminal device transmits the target uplink control information and the target uplink shared channel in the second time unit includes:

the terminal device transmits the first uplink control channel and the target uplink shared channel in the second time unit, where, the target uplink control information is carried on the first uplink control channel.

Figure 3:
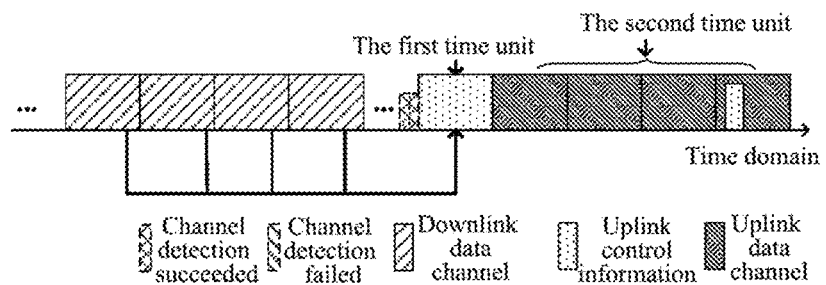
FIG. 3 is an exemplary block diagram of a transmission of uplink control information by a terminal device on a last time unit of the first time unit and the second time unit according to an embodiment of the present application.

FIG. 3 is a schematic block diagram of transmitting the target uplink control information and the target uplink shared channel in the second time unit, in the case that the terminal device has obtained the channel using right of the first time unit and the channel using right of the second time unit in the embodiment of the present application.

In the following, with reference to FIG. 3, in the case that the terminal device has obtained the channel using right of the first time unit and the channel using right of the second time unit, the implementation of transmitting the target uplink control information in the first time unit and the second time unit by the terminal device in the embodiment of the present application is described in detail.

It is assumed that the terminal device in the embodiment of the present application is scheduled to transmit PUCCH and PUSCH on an unlicensed carrier, where the PUCCH is transmitted in the above first time unit, and the PUSCH is transmitted in the above second time unit. As shown in FIG. 3, the second time unit includes 4 time units, and PUCCH and PUSCH are continuous in the time domain. The information transmitted in the PUCCH includes the first HARQ-ACK information corresponding to the PDSCH.

In the embodiment of the present application, the terminal device may perform channel detection on the unlicensed carrier before the first time unit. If the channel detection is successful, as shown in FIG. 3, the terminal device may transmit the first HARQ-ACK information on the last time units both of the first time unit and the second time unit. Where, the first HARQ-ACK information may be transmitted through the PUSCH in the second time unit.

The network device may receive the first HARQ-ACK information sent by the terminal device in the first time unit, and receive the first HARQ-ACK information and PUSCH sent by the terminal device in the second time unit.

In some possible implementations, in the embodiment shown in FIG. 3, the network device may also indicate, through indication information, that the terminal device may transmit the first HARQ-ACK information in the first time unit, and transmit the PUSCH and the first HARQ-ACK information in the second time unit.

It should be understood that in the case that the terminal device has obtained the channel using right of the first time unit and the channel using right of the second time unit, and the transmission of the target uplink control information by the terminal device in the first time unit and the second time unit is only an example, but the embodiment of the present application is not limited to this.

For example, in the case that the terminal device has obtained the channel using right of the first time unit and the channel using right of the second time unit, the terminal device may also transmit the target uplink control information only in the first time unit or the second time unit.

In some embodiments of the present application, before the terminal device transmits the target uplink control information and the target uplink shared channel in the second time unit, the terminal device does not obtain the channel using right of the first time unit.

Figure 4:
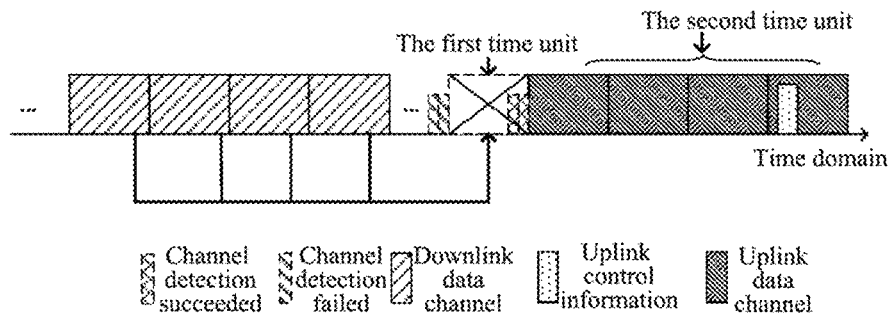
FIG. 4 is an exemplary block diagram of a transmission of uplink control information by a terminal device on a last time unit of the second time unit according to an embodiment of the present application.

FIG. 4 is a schematic block diagram of transmitting the target uplink control information and the target uplink shared channel in the second time unit, in the case that the terminal device of the embodiment of the present application does not obtain the channel using right of the first time unit and the channel using right of the second time unit.

In the following, with reference to FIG. 4, in the case that the terminal device does not obtain the channel using right of the first time unit and has obtained the channel using right of the second time unit, the implementation in which the terminal device in the embodiment of the present application transmits the target uplink control information and the target uplink shared channel in the second time unit will be described in detail.

It is assumed that the terminal device in the embodiment of the present application is scheduled to transmit PUCCH and PUSCH on an unlicensed carrier, In particular, the PUCCH is transmitted in the first time unit, and the PUSCH is transmitted in the second time unit. As shown in FIG. 4, the second time unit includes 4 time units, and PUCCH and PUSCH are continuous in the time domain. The information transmitted in the PUCCH includes the first HARQ-ACK information corresponding to the PDSCH.

In the embodiment of the present application, the terminal device performs channel detection on the unlicensed carrier before the first time unit. If the channel detection fails, the terminal device may perform channel detection on the unlicensed carrier before the second time unit (or each candidate detection moment in the second time unit). If the channel detection succeeds, the terminal device may transmit the first HARQ-ACK information on the last time unit in the second time unit.

The network device may receive the first HARQ-ACK information and PUSCH sent by the terminal device in the second time unit.

In some possible implementations, in the embodiment shown in FIG. 4, the network device may also indicate the terminal device to transmit the first HARQ-ACK information in the first time unit, and transmit the PUSCH and the first HARQ-ACK information in the second time unit through indication information.

It should be understood that the terminal devices shown in FIG. 3 and FIG. 4 being scheduled to transmit PUCCH and PUSCH on unlicensed carriers are only exemplary descriptions, and the embodiments of the present application are not limited there. In other words, the terminal device of the embodiment of the present application may transmit the target uplink control information through the PUCCH in the first time unit, and transmit the first HARQ-ACK information through the PUSCH in the second time unit, where, the first HARQ-ACK information is part information of the target uplink control information. However, the embodiments of the present application are not limited to this.

For example, the terminal device in the embodiment of the present application may transmit the first HARQ-ACK information through the PUSCH in the above first time unit, and transmit the first HARQ-ACK information through the PUSCH in the above second time unit.

For another example, the terminal device in the embodiment of the present application may transmit the first HARQ-ACK information through the PUSCH in the first time unit, and transmit the first HARQ-ACK information through the PUCCH in the above second time unit.

In some embodiments of the present application, the target uplink control information is carried on the target uplink shared channel.

In some embodiments of the present application, the terminal device transmits the first uplink control channel and the target uplink shared channel in the second time unit, where, the target uplink control information is carried on the first uplink control channel.

Figure 5:
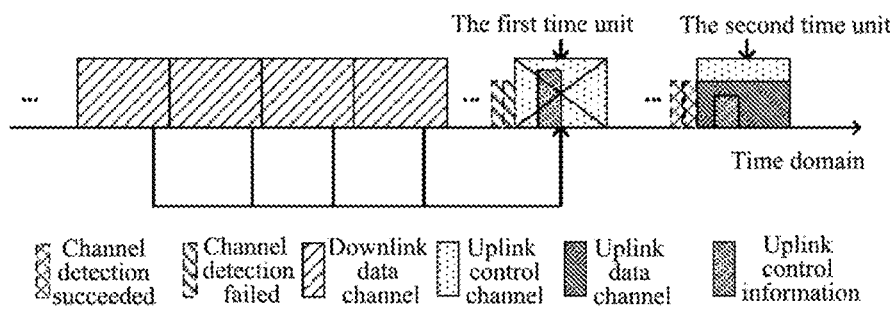
FIG. 5 is an exemplary block diagram of a transmission of uplink control information in the uplink data channel of the second time unit according to an embodiment of the present application.

FIG. 5 is a schematic block diagram of the target uplink control information carried on the target uplink shared channel according to an embodiment of the present application.

As shown in FIG. 5, it is assumed that the terminal device in the embodiment of the present application is scheduled to respectively transmit PUCCH 1 and PUCCH 2 in the first time unit and the second time unit on the unlicensed carrier, specifically, PUCCH 1 is transmitted in the first time unit, PUCCH 2 is transmitted in the second time unit, and the information transmitted in PUCCH 1 and PUCCH 2 both include the first HARQ-ACK information corresponding to the PDSCH. In addition, the terminal device is further scheduled to transmit the PUSCH in the second time unit.

In other words, the network device in the embodiment of the present application may indicate the terminal device to transmit the PUCCH in the second time unit through indication information, that is, the second time unit is a resource allocated to the terminal device to transmit the PUCCH. However, since the terminal device again needs to transmit the PUSCH in the second time unit, a collision between the PUCCH and the PUSCH will occur in the second time unit.

In the embodiment of the present application, the terminal device may transmit the first HARQ-ACK information on the PUSCH in a multiplexing transmission manner in the second time unit.

In the embodiment of the present application, the resources allocated to PUCCH 2 for transmission in the second time unit may not perform any transmission.

In the embodiment of the present application, in the embodiment shown in FIG. 5, the network device may indicate, through the indication information, that the terminal device may transmit the first HARQ-ACK information in the first time unit, and transmit the PUSCH and the first HARQ-ACK information in the second time unit.

Figure 6:
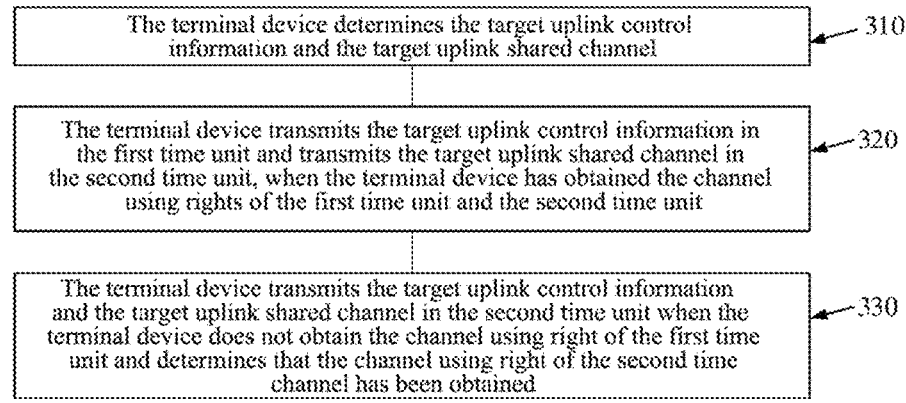
FIG. 6 is another schematic flowchart of a method for transmitting information according to an embodiment of the present application.

FIG. 6 shows a schematic flowchart of a method 300 for transmitting information by a terminal device according to an embodiment of the present application. The method 300 may be applied to an unlicensed carrier, the first time unit on the unlicensed carrier is used to transmit target uplink control information, and the second time unit on the unlicensed carrier is used to transmit the target uplink shared channel. The second time unit is located after the first time unit in the time domain. The method 300 may be executed by a terminal device. For example, it may be the terminal device as shown in FIG. 1.

As shown in FIG. 6, the method 300 includes some or all of the following contents:

310, the terminal device determines the target uplink control information and the target uplink shared channel.

320, the terminal device transmits the target uplink control information in the first time unit and transmits the target uplink shared channel in the second time unit, when the terminal device has obtained the channel using rights of the first time unit and the second time unit.

330, the terminal device transmits the target uplink control information and the target uplink shared channel in the second time unit when the terminal device does not obtain the channel using right of the first time unit and determines that the channel using right of the second time channel has been obtained.

In the embodiment of the present application, the terminal device may determine the time unit used to transmit the target uplink control information and the time unit used to transmit the target uplink shared channel according to whether the channel using right of the first time unit and the channel using right of the channel using right of the second time unit have been obtained. Specifically, when the terminal device has obtained the channel using right of the first time unit, the existing information transmission method may be adopted. When the terminal device does not obtain the using right of the first time unit, the terminal device transmits the target uplink control information and the target uplink shared channel in the second time unit. Through the above technical solutions, the transmission success rate of the uplink control information can be effectively ensured.

In some embodiments of the present application, the channel used to piggyback the target uplink control information in the first time unit is a physical uplink control channel PUCCH; or, the channel used to piggyback the target uplink control information in the first time unit is a scheduled physical uplink shared channel PUSCH; or, the channel used to piggyback the target uplink control information in the first time unit is pre-configured PUSCH.

In some embodiments of the present application, the target uplink shared channel is a scheduled physical uplink shared channel PUSCH, and/or, the target uplink shared channel is a pre-configured PUSCH.

In some embodiments of the present application, before the terminal device transmits the target uplink control information and the target uplink shared channel in the second time unit, the terminal device receives indication information sent by a network device, where the indication information is used to indicate that the terminal device may transmit the target uplink control information in the first time unit, and may transmit the target uplink shared channel in the second time unit.

In some embodiments of the present application, the indication information is further used to indicate that the terminal device can transmit the target uplink control information in the second time unit.

In some embodiments of the present application, the indication information is physical layer signaling, and/or the indication information is higher layer signaling.

In some embodiments of the present application, the target uplink control information includes at least one of the uplink control information such as hybrid automatic repeat request acknowledgement HARQ-ACK information, CSI, and scheduling request information.

In some embodiments of the present application, the first time unit and the second time unit are continuous in the time domain.

Figure 7:
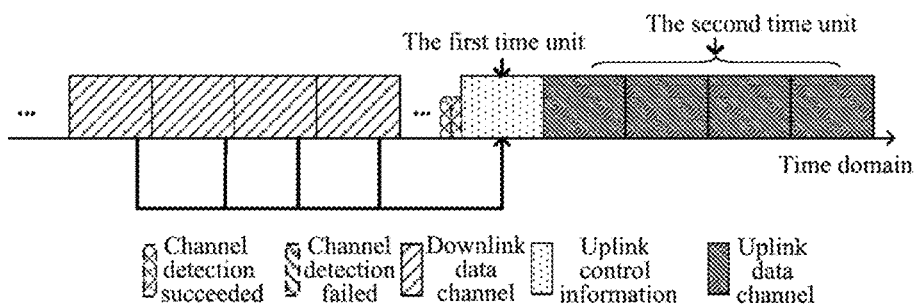
FIG. 7 is an exemplary block diagram of transmitting uplink control information in a first time unit and transmitting a target uplink shared channel in a second time unit a by a terminal device according to an embodiment of the present application.

FIG. 7 is an example in which a terminal device transmits target uplink control information in the first time unit and transmits a target uplink shared channel in the second time unit according to an embodiment of the present application.

It is assumed that the terminal device is scheduled to transmit PUCCH and PUSCH on an unlicensed carrier, In particular, the PUCCH is transmitted in the first time unit, and the PUSCH is transmitted in the second time unit. As shown in FIG. 7, the second time unit includes 4 time units, and the PUCCH and the PUSCH are continuous in the time domain. The information transmitted in the PUCCH includes the first HARQ-ACK information corresponding to the PDSCH.

In the embodiment of the present application, the terminal device may perform channel detection on the unlicensed carrier before the first time unit. If the channel detection is successful, the terminal device may transmit the first HARQ-ACK information in the first time unit, and not transmit the first HARQ-ACK information on the last time unit in the second time unit. The network device receives the first HARQ-ACK information sent by the terminal device in the first time unit, and receives the PUSCH sent by the terminal device in the second time unit.

In some possible implementations, in the embodiment shown in FIG. 7, the network device may also indicate, through indication information, the terminal device to transmit the first HARQ-ACK information in the first time unit and transmit the PUSCH and the first HARQ-ACK information in the second time unit.

It can be found that, in the embodiment of the present application, when the terminal device transmits PUCCH and PUSCH on continuous time units in the time domain on the unlicensed carrier, and when the terminal device has obtained the channel using rights of the first time unit and the second time unit, transmitting the target uplink control information in the first time unit and transmitting the target uplink shared channel in the second time unit may be preferentially used, and =the use of sending uplink control information on the PUSCH is avoided, thereby ensuring the transmission performance of the PUSCH in the second time unit. When the terminal device does not obtain the channel using right of the first time unit and obtains the channel using right of the second time unit, the target uplink control information and the target uplink shared channel may be transmitted in the second time unit, so that the target uplink control information has multiple transmission opportunities in the time domain, thereby ensuring the transmission performance of the target uplink control information.

It should be noted that, under the premise of no conflict, the each embodiment and/or the technical features of each embodiment described in the present application can be combined with each other arbitrarily, and the technical solutions obtained after the combination should also fall within the protection scope of the present application.

It should be understood that, in the each embodiment of the present application, the big or small of the sequence number of the above each process does not mean the order of execution, and the execution order of each process should be determined by its function and internal logic, and should not constitute any limitation to the implementation process of the embodiments of the present application.

The method according to the embodiment of the present application is described in detail from the perspective of information transmitting by the terminal device with reference to FIG. 2 to FIG. 7. The method according to the embodiment of the present application will be described below from the perspective of information receiving by the network device with reference to FIG. 8 to FIG. 9.

Figure 8:
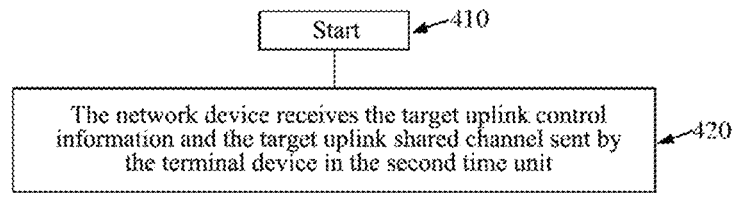
FIG. 8 is a schematic flowchart of a method for receiving information according to an embodiment of the present application.

FIG. 8 shows a schematic flowchart of a method 400 for a network device to receive information according to an embodiment of the present application. The method 400 may be applied to an unlicensed carrier, and the first time unit on the unlicensed carrier is used to transmit the target uplink control information. The second time unit on the unlicensed carrier is used to transmit the target uplink shared channel, and the second time unit is located after the first time unit in the time domain. The method 400 may be executed by the network device. For example, it can be the network device as shown in FIG. 1.

As shown in FIG. 8, the method 400 includes some or all of the following contents:

410, start.

420, the network device receives the target uplink control information and the target uplink shared channel sent by the terminal device in the second time unit.

In some embodiments of the present application, the channel used to piggyback the target uplink control information in the first time unit is a physical uplink control channel PUCCH; or, the channel used to piggyback the target uplink control information in the first time unit is a scheduled physical uplink shared channel PUSCH; or, the channel used to piggyback the target uplink control information in the first time unit is pre-configured PUSCH.

In some embodiments of the present application, the target uplink shared channel is a scheduled physical uplink shared channel PUSCH, and/or, the target uplink shared channel is a pre-configured PUSCH.

In some embodiments of the present application, before the network device receives the target uplink control information and the target uplink shared channel sent by the terminal device in the second time unit, the network device sends indication information to the terminal device, where the indication information is used to indicate that the terminal device can transmit the target uplink control information in the first time unit and can transmit the target uplink shared channel in the second time unit.

In some embodiments of the present application, the indication information is further used to indicate that the terminal device can transmit the target uplink control information in the second time unit.

In some embodiments of the present application, the indication information is physical layer signaling, and/or, the indication information is higher layer signaling.

In some embodiments of the present application, the network device receives the target uplink control information sent by the terminal device in the first time unit.

In some embodiments of the present application, the target uplink control information includes at least one of the uplink control information such as hybrid automatic repeat request acknowledgement HARQ-ACK information, CSI, and scheduling request information.

In some embodiments of the present application, the second time unit includes at least two time units, and the target uplink control information is located in the last time unit or the penultimate time unit of the at least two time units.

In some embodiments of the present application, the first time unit and the second time unit are continuous in the time domain.

In some embodiments of the present application, the target uplink control information is carried on the target uplink shared channel.

In some embodiments of the present application, the network device receives the first uplink control channel and the target uplink shared channel sent by the terminal device in the second time unit, where the target uplink control information is carried on the first uplink control channel.

It should be understood that the steps in the method 400 for receiving information by a network device shown in FIG. 8 can refer to the corresponding steps in the method 200 or the method 300 for transmitting information by a terminal device. For brevity, details are not repeated here.

Figure 9:
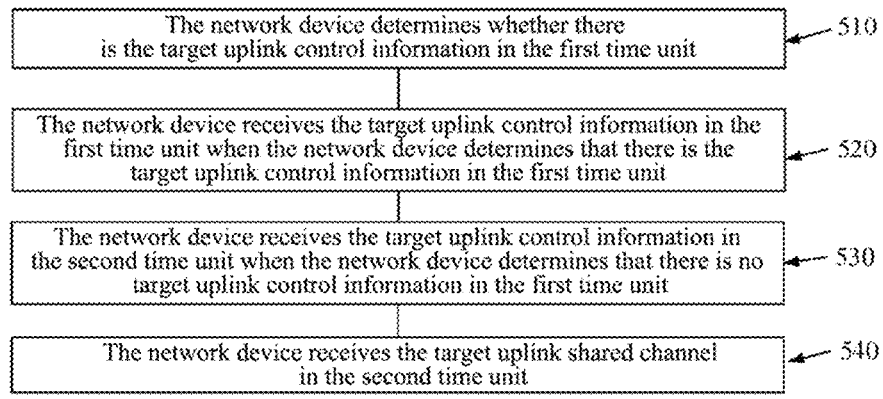
FIG. 9 is another schematic flowchart of a method for receiving information according to an embodiment of the present application

FIG. 9 shows a schematic flowchart of a method 500 for receiving information by a network device according to an embodiment of the present application. The method 500 can be applied to an unlicensed carrier. The first time unit on the unlicensed carrier is used to transmit target uplink control information, and the second time unit on the unlicensed carrier is used to transmit the target uplink shared channel. The second time unit is located after the first time unit in the time domain. The method 500 may be executed by a network device. For example, it can be the network device as shown in FIG. 1.

As shown in FIG. 9, the method 500 includes some or all of the following contents:

510, the network device determines whether there is the target uplink control information in the first time unit.

520, the network device receives the target uplink control information in the first time unit when the network device determines that there is target uplink control information in the first time unit.

530, the network device receives the target uplink control information in the second time unit when the network device determines that there is no target uplink control information in the first time unit.

540, the network device receives the target uplink shared channel in the second time unit.

In some embodiments of the present application, the channel used to piggyback the target uplink control information in the first time unit is a physical uplink control channel PUCCH; or, the channel used to piggyback the target uplink control information in the first time unit is a scheduled physical uplink shared channel PUSCH; or, the channel used to piggyback the target uplink control information in the first time unit is pre-configured PUSCH.

In some embodiments of the present application, the target uplink shared channel is a scheduled physical uplink shared channel PUSCH, and/or, the target uplink shared channel is a pre-configured PUSCH.

In some embodiments of the present application, before the network device determines whether there is the target uplink control information in the first time unit, the network device sends indication information to the terminal device, where the indication information is used to indicate that the terminal device can transmit the target uplink control information in the first time unit, and can transmit the target uplink shared channel in the second time unit.

In some embodiments of the present application, the indication information is further used to indicate that the terminal device can transmit the target uplink control information in the second time unit.

In some embodiments of the present application, the indication information is physical layer signaling, or the indication information is higher layer signaling.

In some embodiments of the present application, the target uplink control information includes at least one of the uplink control information such as hybrid automatic repeat request acknowledgement HARQ-ACK information, CSI, and scheduling request information.

In some embodiments of the present application, the first time unit and the second time unit are continuous in the time domain.

It should be understood that the steps in the method 500 for receiving information by a network device shown in FIG. 9 can refer to the corresponding steps in the method 200 or the method 300 for transmitting information by a terminal device. For brevity, details are not described herein again.

The method embodiments of the present application are described in detail above with reference to FIG. 1 to FIG. 9, and the apparatus embodiments of the present application are described in detail below in with reference to FIG. 10 to FIG. 13.

Figure 10:
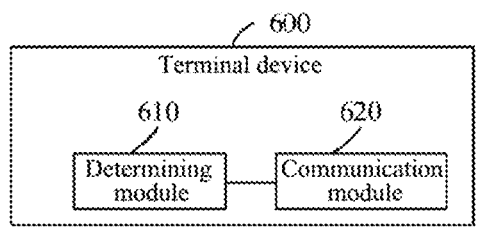
FIG. 10 is a schematic block diagram of a terminal device according to an embodiment of the present application.

FIG. 10 is a schematic block diagram of a terminal device 600 according to an embodiment of the present application. The terminal device 600 may be applied to an unlicensed carrier, the first time unit on the unlicensed carrier is used to transmit target uplink control information, the second time unit on the unlicensed carrier is used to transmit the target uplink shared channel, and the second time unit is located after the first time unit in the time domain.

Specifically, as shown in FIG. 10, the terminal device 600 may include a determining module 610 and a communication module 620.

In some embodiments of the present application, the determining module 610 is configured to determine the target uplink control information and the target uplink shared channel; and the communication module 620 is configured to transmit the target uplink control information and the target uplink shared channel in the second time unit.

In some embodiments of the present application, the channel used to piggyback the target uplink control information in the first time unit is a physical uplink control channel PUCCH; or, the channel used to piggyback the target uplink control information in the first time unit is a scheduled physical uplink shared channel PUSCH; or, the channel used to piggyback the target uplink control information in the first time unit is pre-configured PUSCH.

In some embodiments of the present application, the target uplink shared channel is a scheduled physical uplink shared channel PUSCH, and/or, the target uplink shared channel is a pre-configured PUSCH.

In some embodiments of the present application, before the communication module 620 transmits the target uplink control information and the target uplink shared channel in the second time unit, the communication module 620 is further configured to:

receive indication information sent by a network device, where the indication information is used to indicate that the terminal device can transmit the target uplink control information in the first time unit, and can transmit the target uplink shared channel in the second time unit.

In some embodiments of the present application, the indication information is further used to indicate that the terminal device can transmit the target uplink control information in the second time unit.

In some embodiments of the present application, the indication information is physical layer signaling, and/or, the indication information is higher layer signaling.

In some embodiments of the present application, before the communication module 620 transmits the target uplink control information and the target uplink shared channel in the second time unit, the terminal device has obtained the channel using right of the second time unit.

In some embodiments of the present application, before the communication module 620 transmits the target uplink control information and the target uplink shared channel in the second time unit, the terminal device does not obtain the channel using right of the first time unit.

In some embodiments of the present application, before the communication module 620 transmits the target uplink control information and the target uplink shared channel in the second time unit, the terminal device has obtained the channel using right of the first time unit.

In some embodiments of the present application, the communication module 620 is further configured to:

transmit the target uplink control information in the first time unit.

In some embodiments of the present application, the target uplink control information includes hybrid automatic repeat request acknowledgement HARQ-ACK information.

In some embodiments of the present application, the second time unit includes at least two time units, and the target uplink control information is located in the last time unit or the penultimate time unit of the at least two time units.

In some embodiments of the present application, the first time unit and the second time unit are continuous in the time domain.

In some embodiments of the present application, the target uplink control information is carried on the target uplink shared channel.

In some embodiments of the present application, the communication module 620 is specifically configured to:
transmit the first uplink control channel and the target uplink shared channel in the second time unit, where the target uplink control information is carried on the first uplink control channel.

In some embodiments of the present application, the determining module 610 is configured to determine the target uplink control information and the target uplink shared channel. When the terminal device has obtained the channel using rights of the first time unit and the second time unit, the communication module 620 transmits the target uplink control information in the first time unit, and transmits the target uplink shared channel in the second time unit. When the terminal device does not obtain the channel using right of the first time unit and determines that the channel using right of the second time unit has been obtained, the communication module 620 transmits the target uplink control information and the target uplink shared channel in the second time unit.

In some embodiments of the present application, the channel used to piggyback the target uplink control information in the first time unit is the physical uplink control channel PUCCH; or,
the channel used to piggyback the target uplink control information in the first time unit is the scheduled physical uplink shared channel PUSCH; or,
the channel used to piggyback the target uplink control information in the first time unit is a pre-configured PUSCH.

In some embodiments of the present application, the target uplink shared channel is a scheduled physical uplink shared channel PUSCH, and/or, the target uplink shared channel is a pre-configured PUSCH.

In some embodiments of the present application, before the communication module 620 transmits the target uplink control information and the target uplink shared channel in the second time unit, the communication module 620 is further configured to:
receive indication information sent by a network device, where the indication information is used to indicate that the terminal device can transmit the target uplink control information in the first time unit, and can transmit the target uplink shared channel in the second time unit.

In some embodiments of the present application, the indication information is further used to indicate that the terminal device can transmit the target uplink control information in the second time unit.

In some embodiments of the present application, the indication information is physical layer signaling, and/or, the indication information is higher layer signaling.

In some embodiments of the present application, the target uplink control information includes hybrid automatic repeat request acknowledgement HARQ-ACK information.

In some embodiments of the present application, the first time unit and the second time unit are continuous in the time domain.

It should be understood that the device embodiment and the method embodiment may correspond to each other, and similar descriptions may refer to the method embodiment. Specifically, the terminal device 600 shown in FIG. 10 may correspond to a corresponding subject performing the method 200 or the method 300 of the embodiment of the present application, and the foregoing and other operations and/or functions of the each unit in the terminal device 600 are used to implement the corresponding process in the each method in FIG. 2 or FIG. 6, respectively. For brevity, details are not repeated here.

Figure 11:
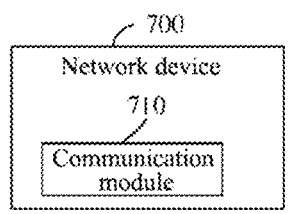
FIG. 11 is a schematic block diagram of a network device according to an embodiment of the present application.

FIG. 11 is a schematic block diagram of a network device 700 according to an embodiment of the present application. The network device 700 may be applied to an unlicensed carrier, where the first time unit on the unlicensed carrier is used to transmit target uplink control information, the second time unit on the unlicensed carrier is used to transmit the target uplink shared channel, and the second time unit is located after the first time unit in the time domain.

Specifically, as shown in FIG. 11, the network device 700 may include:
a communication module 710, configured to receive the target uplink control information and the target uplink shared channel sent by the terminal device in the second time unit.

In some embodiments of the present application, the channel used to piggyback the target uplink control information in the first time unit is a physical uplink control channel PUCCH; or, the channel used to piggyback the target uplink control information in the first time unit is a scheduled physical uplink shared channel PUSCH; or, the channel used to piggyback the target uplink control information in the first time unit is pre-configured PUSCH.

In some embodiments of the present application, the target uplink shared channel is a scheduled physical uplink shared channel PUSCH, and/or, the target uplink shared channel is a pre-configured PUSCH.

In some embodiments of the present application, the target uplink shared channel is a scheduled physical uplink shared channel PUSCH, and/or, the target uplink shared channel is a pre-configured PUSCH.

In some embodiments of the present application, before the communication module 710 receives the target uplink control information and the target uplink shared channel sent by the terminal device in the second time unit, the communication module 710 is further configured to:
send indication information to the terminal device, where the indication information is used to indicate that the terminal device can transmit the target uplink control information in the first time unit, and can transmit the target uplink shared channel in the second time unit.

In some embodiments of the present application, the indication information is further used to indicate that the terminal device can transmit the target uplink control information in the second time unit.

In some embodiments of the present application, the indication information is physical layer signaling, and/or, the indication information is higher layer signaling.

In some embodiments of the present application, the communication module 710 is further configured to:

receive the target uplink control information sent by the terminal device in the first time unit.

In some embodiments of the present application, the target uplink control information includes hybrid automatic repeat request acknowledgement HARQ-ACK information.

In some embodiments of the present application, the second time unit includes at least two time units, and the target uplink control information is located in the last time unit or the penultimate time unit of the at least two time units.

In some embodiments of the present application, the first time unit and the second time unit are continuous in the time domain.

In some embodiments of the present application, the target uplink control information is carried on the target uplink shared channel.

In some embodiments of the present application, the communication module 710 is specifically configured to:
receive first uplink control channel and the target uplink shared channel sent by the terminal device in the second time unit, where the target uplink control information is carried on the first uplink control channel.

It should be understood that the apparatus embodiment and the method embodiment may correspond to each other, and similar descriptions may refer to the method embodiment. Specifically, the network device 700 shown in FIG. 11 may correspond to a corresponding subject in the method 400 that executes the embodiment of the present application, and the foregoing and other operations and/or functions of the each unit in the network device 700 are used to implement the corresponding processes in the each method in FIG. 8, respectively. For brevity, details are not repeated here.

Figure 12:
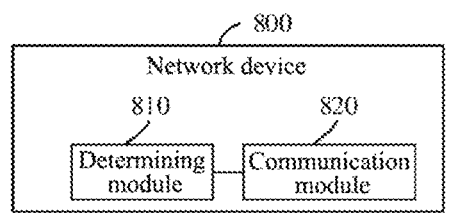
FIG. 12 is another schematic block diagram of a network device according to an embodiment of the present application.

FIG. 12 is a schematic block diagram of a network device 800 according to an embodiment of the present application. The network device 700 may be applied to an unlicensed carrier, where the first time unit on the unlicensed carrier is used to transmit target uplink control information, the second time unit on the unlicensed carrier is used to transmit the target uplink shared channel, and the second time unit is located after the first time unit in the time domain.

Specifically, as shown in FIG. 12, the network device 800 may include:
a determination module 810 and a communication module 820:
the determining module 810 is configured to determine whether there is the target uplink control information in the first time unit;
when the determining module 810 determines that there is the target uplink control information in the first time unit, the communication module 820 receives the target uplink control information in the first time unit;
when the determining module 810 determines that there is no target uplink control information in the first time unit, the communication module 820 receives the target uplink control information in the second time unit; and
the communication module 820 is further configured to receive the target uplink shared channel in the second time unit.

In some embodiments of the present application, the channel used to piggyback the target uplink control information in the first time unit is the physical uplink control channel PUCCH; or,
the channel used to piggyback the target uplink control information in the first time unit is the scheduled physical uplink shared channel PUSCH; or,
the channel used to piggyback the target uplink control information in the first time unit is a pre-configured PUSCH.

In some embodiments of the present application, the target uplink shared channel is a scheduled physical uplink shared channel PUSCH, and/or, the target uplink shared channel is a pre-configured PUSCH.

In some embodiments of the present application, before the determining module 810 determines whether there is the target uplink control information in the first time unit, the communication module 820 is further configured to:
send indication information to the terminal device, where the indication information is used to indicate that the terminal device can transmit the target uplink control information in the first time unit, and can transmit the target uplink shared channel in the second time unit.

In some embodiments of the present application, the indication information is further used to indicate that the terminal device can transmit the target uplink control information in the second time unit.

In some embodiments of the present application, the indication information is physical layer signaling, or the indication information is higher layer signaling.

In some embodiments of the present application, the target uplink control information includes hybrid automatic repeat request acknowledgement HARQ-ACK information.

In some embodiments of the present application, the first time unit and the second time unit are continuous in the time domain.

It should be understood that the apparatus embodiment and the method embodiment may correspond to each other, and similar descriptions may refer to the method embodiment. Specifically, the network device 800 shown in FIG. 12 may correspond to a corresponding subject in the method 500 that executes the embodiment of the present application, and the foregoing and other operations and/or functions of the each unit in the network device 800 are used to implement the corresponding processes in the each method in FIG. 9, respectively. For brevity, details are not repeated here.

The communication device of the embodiment of the present application is described above from the perspective of functional modules with reference to FIG. 10 to FIG. 12. It should be understood that the functional module can be implemented in a form of hardware, can also be implemented in a form of software instructions, or can be implemented in a combination of hardware and software modules.

Specifically, the each step of the method embodiments in the embodiments of the present application can be completed by hardware integrated logic circuits and/or instructions in the form of software in the processor. The steps of the method disclosed in combination with the embodiments of the present application can be directly embodied as being executed and completed by a hardware decoding processor, or executed and completed by a combination of hardware and software modules in the decoding processor.

In some possible implementations, the software module may be located in a random access memory, and mature storage medium in the field, such as flash memory, read-only memory, programmable read-only memory, electrically erasable programmable memory, and registers. The storage medium is located in the memory, and the processor reads the information in the memory and completes the steps in the above method embodiments in combination with its hardware.

For example, in the embodiment of the present application, the determining module may be implemented by a processor, and the communication module may be implemented by a transceiver.

Figure 13:
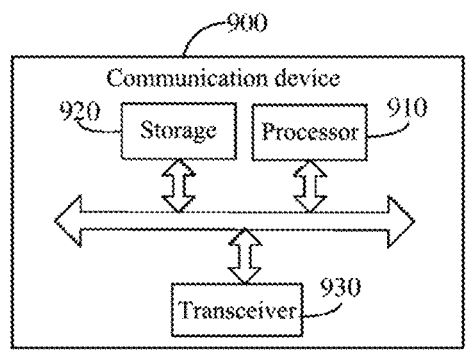
FIG. 13 is a schematic block diagram of a communication device according to an embodiment of the present application.

FIG. 13 is a schematic structural diagram of a communication device 900 according to an embodiment of the present application. The communication device 900 shown in FIG. 13 includes a processor 910, and the processor 910 can call and run a computer program from the memory to implement the method in the embodiment of the present application.

In some possible implementations, as shown in FIG. 9, the communication device 900 may further include a memory 920. The memory 920 may be used to store indication information, and may also be used to store codes and instructions executed by the processor 910. Where the processor 910 may call and run a computer program from the memory 920 to implement the method in the embodiment of the present application.

Where, the memory 920 may be a separate element independent of the processor 910, or may be integrated in the processor 910.

In some possible implementations, as shown in FIG. 9, the communication device 900 may further include a transceiver 930, and the processor 910 may control the transceiver 930 to communicate with other devices. Specifically, it can send information or data to other devices, or receive information or data sent by other devices.

Where, the transceiver 930 may include a transmitter and a receiver. The transceiver 930 may further include an antenna, and the number of the antennas may be one or more.

In some possible implementations, the communication device 900 may be a network device in an embodiment of the present application, and the communication device 900 may implement corresponding processes implemented by the network device in each method in the embodiments of the present application. In other words, the communication device 900 in the embodiment of the present application may correspond to the network device 700 or the network device 800 in the embodiment of the present application, and may correspond to the network device performing the method according to the embodiment of the present application. For brevity, details are not repeated here.

In some possible implementations, the communication device 900 may be a terminal device of an embodiment of the application, and the communication device 900 may implement the corresponding process implemented by the terminal device in each method of the embodiment of the application. In other words, the communication device 900 in the embodiment of the present application may correspond to the terminal device 600 in the embodiment of the present application, and may correspond to the terminal device that executes the method 200 according to the embodiment of the present application. For brevity, details are not repeated here.

It should be understood that the each component in the communication device 900 are connected by a bus system, where in addition to a data bus, the bus system also includes a power bus, a control bus, and a status signal bus.

In addition, an embodiment of the present application also provides a chip, where the chip may be an integrated circuit chip with signal processing capability, and can implement or execute each method, step, and logical block diagram disclosed in the embodiments of the present application.

In some possible implementations, the chip can be applied to each communication device, so that the communication device installed with the chip can execute each method, step, and logical block diagram disclosed in the embodiments of the present application.

Figure 14:
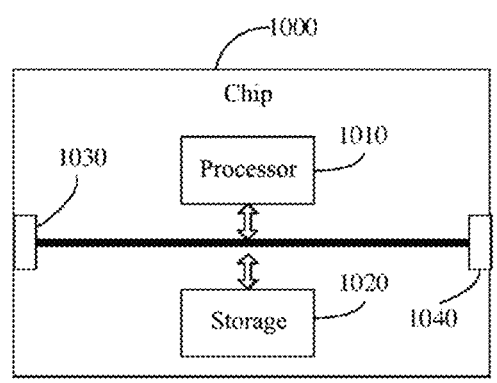
FIG. 14 is a schematic block diagram of a chip according to an embodiment of the present application.

FIG. 14 is a schematic structural diagram of a chip according to an embodiment of the present application.

The chip 1000 shown in FIG. 14 includes a processor 1010, and the processor 1010 can call and run a computer program from the memory to implement the method in the embodiment of the present application.

In some possible implementations, as shown in FIG. 14, the chip 1000 may further include a memory 1020. Where, the processor 1010 can call and run a computer program from the memory 1020 to implement the method in the embodiment of the present application. The memory 1020 may be used to store indication information, and may also be used to store codes and instructions, etc., executed by the processor 1010.

Where, the memory 1020 may be a separate device independent of the processor 1010, or it may be integrated in the processor 1010.

In some possible implementations, the chip 1000 may further include an input interface 1030. Where the processor 1010 can control the input interface 1030 to communicate with other devices or chips, and specifically, can obtain information or data sent by other devices or chips.

In some possible implementations, the chip 1000 may further include an output interface 1040. Where the processor 1010 can control the output interface 1040 to communicate with other devices or chips, specifically, can output information or data to other devices or chips.

In some possible implementations, the chip can be applied to the network device in the embodiment of the present application, and the chip can implement the corresponding process implemented by the network device in the each method of the embodiment of the present application. For brevity, details are not repeated here.

In some possible implementations, the chip can be applied to the terminal device in the embodiment of the present application, and the chip can implement the corresponding process implemented by the terminal device in each method of the embodiment of the present application. For brevity, details are not repeated here.

It should be understood that the chip mentioned in the embodiment of the present application may also be referred to as a system level chip, a system chip, a chip system, or a system on chip, etc. It should also be understood that the each component in the chip 700 are connected by a bus system, among them, in addition to the data bus, the bus system also includes a power bus, a control bus, and a status signal bus.

The processor mentioned in the embodiments of the present application may be a general-purpose processor, a digital signal processor (digital signal processor, DSP), an application specific integrated circuit (application specific integrated circuit, ASIC), a field programmable gate array (field programmable gate array, FPGA) or other programmable logic elements, transistor logic elements, discrete hardware components, etc. In addition, the general-purpose processor may be a microprocessor or the processor may also be any conventional processor, etc.

In addition, the memory mentioned in the embodiments of the present application may be a volatile memory or a non-volatile memory, or may include both volatile and non-volatile memories. Among them, the non-volatile memory can be a read-only memory (read-only memory, ROM), a programmable read-only memory (programmable ROM, PROM), an erasable programmable read-only memory (erasable EPROM, EPROM), and an electrically erasable programmable read-only memory (electrically EPROM, EEPROM) or a flash memory. The volatile memory may be a random access memory (random access memory, RAM), which is used as an external cache.

It should be understood that the above memory is exemplary but not restrictive. For example, the memory in the embodiment of the present application may also be a static random access memory (static RAM, SRAM), a dynamic random access memory (dynamic RAM, DRAM), a synchronous dynamic random access memory (synchronous DRAM, SDRAM), a dual double data rate synchronous dynamic random access memory (double data rate SDRAM, DDR SDRAM), an enhanced synchronous dynamic random access memory (enhanced SDRAM, ESDRAM), a synchronous connection dynamic random access memory (synch link DRAM, SLDRAM) and a direct ram bus random access memory (Direct Rambus RAM, DR RAM), etc.

The embodiment of the present application also provides a computer-readable storage medium for storing computer programs.

In some possible implementations, the computer-readable storage medium may be applied to the network device in the embodiment of the present application, and the computer program causes the computer to execute the corresponding process implemented by the network device in each method of the embodiment of the present application. For brevity, details are not repeated here.

In some possible implementations, the computer-readable storage medium can be applied to the mobile terminal/the terminal device in the embodiment of the present application, and the computer program enables the computer to execute the corresponding process implemented by the mobile terminal/the terminal device in each method of the embodiment of the present application. For brevity, details are not repeated here.

An embodiment of the present application also provides a computer program product, which includes computer program instructions.

In some possible implementations, the computer program product may be applied to the network device in the embodiment of the present application, and the computer program instructions cause the computer to execute the corresponding process implemented by the network device in each method of the embodiment of the present application. For brevity, details are not repeated here.

In some possible implementations, the computer-readable storage medium can be applied to a mobile terminal/the terminal device in the embodiment of the present application, and the computer program enables the computer to execute the corresponding process implemented by the mobile terminal/the terminal device in each method of the embodiment of the present application. For brevity, details are not repeated here.

An embodiment of the present application also provides a computer program.

In some possible implementations, the computer program may be applied to the network device in the embodiment of the present application, and when running on the computer, the computer program causes the computer to execute the corresponding process implemented by the network device in each method of the embodiment of the present application. For brevity, details are not repeated here.

An embodiment of the present application also provides a communication system, which includes a terminal device and a network device.

Where, the terminal device can be used to implement the corresponding functions implemented by the terminal device in the above method 200 or 300, and the composition of the terminal device can be as shown in the terminal device 600 in FIG. 10. For brevity, details are not repeated here.

The network device can be used to implement the corresponding functions implemented by the network device in the above method 400 or 500, and the composition of the network device can be as shown in the network device 700 in FIG. 11 or as shown in the network device 800 in FIG. 12. For brevity, details are not repeated here.

It should be noted that the term "system" herein can also be referred to as "network management architecture" or "network system", etc.

It should also be understood that the terms used in the embodiments of the present application and the appended claims are only for the purpose of describing specific embodiments, and are not intended to limit the embodiments of the present application.

For example, the singular forms of "a", "the", "above" and "said" used in the embodiments of the present application and the appended claims are also intended to include plural forms, unless the context clearly indicates other meanings.

Those skilled in the art may realize that the units and algorithm steps of the examples described in combination with the embodiments disclosed herein can be implemented by electronic hardware or a combination of computer software and electronic hardware. Whether these functions are executed by hardware or software depends on the specific application and design constraint conditions of the technical solution. Professionals can use different methods for each specific application to implement the described functions, but such implementation should not be considered as going beyond the scope of the embodiments of the present application.

If implemented in the form of a software functional unit and sold or used as an independent product, it can be stored in a computer readable storage medium. Based on this understanding, the technical solution of an embodiment of the present application in essence or the part that contributes to the prior art or the part of the technical solution may be embodied in the form of software products. The computer software product is stored in a storage medium and includes several instructions to make a computer device (which may be a personal computer, a server, or a network device, etc.) execute all or part of the steps of the method described in the embodiments of the present application. And the aforementioned storage media include: a U disk, a mobile hard disk, a read-only memory, a random access memory, a magnetic disk or an optical disk and other media that can store program codes.

Those skilled in the art can clearly understand that, for convenience and concise description, the specific working process of the above-described system, device, and unit can refer to the corresponding process in the foregoing method embodiment, and details are not described herein again.

In the several embodiments provided in the present application, it should be understood that the disclosed system, device, and method may be implemented in other ways.

For example, the division of units or modules or components in the apparatus embodiments described above is only a logical function division, and there may be other divisions in actual implementation. For example, multiple units or modules or components can be combined or integrated into another system, or some units or modules or components can be omitted or not be executed.

For another example, the units/modules/components described as separate/display components may or may not be physically separated, that is, they may be located in one place, or they may be distributed on multiple network units. Some or all of the units/modules/components may be selected according to actual needs to achieve the objectives of the embodiments of the present application.

Finally, it should be illustrated that the mutual coupling or direct coupling or communication connection shown or discussed above may be indirect coupling or communication connection through some interfaces, apparatus or units, and may be in electrical, mechanical or other forms.

The above contents are only the specific implementations of the embodiments of the application, but the protection scope of the embodiments of the application is not limited thereto. Any person skilled in the art can easily think of changes or replacements within the technical scope disclosed in the embodiments of the present application, which shall be covered by the protection scope of the embodiments of the present application. Therefore, the protection scope of the embodiments of the present application should be subject to the protection scope of the claims.

What is claimed is:

1. A method for transmitting information, wherein the method is applied to an unlicensed carrier, a first time unit on the unlicensed carrier is used to transmit target uplink control information, a second time unit on the unlicensed carrier is used to transmit a target uplink shared channel, and the second time unit is located after the first time unit in a time domain, the first time unit and the second time unit are continuous in the time domain; and the method comprises:
determining, by a terminal device, the target uplink control information and the target uplink shared channel; and
   transmitting, by the terminal device, the target uplink control information and the target uplink shared channel in the second time unit;
   wherein before the transmitting, by the terminal device, the target uplink control information and the target uplink shared channel in the second time unit, the terminal device has obtained a channel using right of the second time unit and the terminal device has obtained a channel using right of the first time unit;
   wherein the method further comprises:
   transmitting, by the terminal device, the target uplink control information in the first time unit.

2. The method according to claim 1, wherein a channel used to piggyback the target uplink control information in the first time unit is a physical uplink control channel (PUCCH); or,
   the channel used to piggyback the target uplink control information in the first time unit is a scheduled physical uplink shared channel (PUSCH); or,
   the channel used to piggyback the target uplink control information in the first time unit is a pre-configured PUSCH.

3. The method according to claim 1, wherein before the transmitting, by the terminal device, the target uplink control information and the target uplink shared channel in the second time unit, the method further comprises:
   receiving, by the terminal device, indication information sent by a network device, wherein the indication information is used to indicate that the terminal device can transmit the target uplink control information in the first time unit, and can transmit the target uplink shared channel in the second time unit;
   wherein the indication information is further used to indicate that the terminal device can transmit the target uplink control information in the second time unit; and
   the indication information is physical layer signaling, and/or the indication information is higher layer signaling.

4. The method according to claim 1, wherein the target uplink control information comprises hybrid automatic repeat request acknowledgement (HARQ-ACK) information.

5. The method according to claim 1, wherein the second time unit comprises at least two time units, and the target uplink control information is located in a last time unit or a penultimate time unit of the at least two time units; and
   the target uplink control information is carried on the target uplink shared channel.

6. The method according to claim 1, wherein the transmitting, by the terminal device, the target uplink control information and the target uplink shared channel in the second time unit comprises:
   transmitting, by the terminal device, a first uplink control channel and the target uplink shared channel in the second time unit, wherein the target uplink control information is carried on the first uplink control channel.

7. A terminal device, wherein the device is applied to an unlicensed carrier, a first time unit on the unlicensed carrier is configured to transmit target uplink control information, the second time unit on the unlicensed carrier is configured to transmit a target uplink shared channel, and the second time unit is located after the first time unit in a time domain, the first time unit and the second time unit are continuous in the time domain; and the terminal device comprises:
   a processor, configured to call and run a computer program from a memory, the computer program comprising: instructions for executing the method, so that the processor is further configured to:
   determine the target uplink control information and the target uplink shared channel; and
   transmit the target uplink control information and the target uplink shared channel in the second time unit;
   wherein before the processor transmits the target uplink control information and the target uplink shared channel in the second time unit, the terminal device has obtained a channel using right of the second time unit and the terminal device has obtained a channel using right of the first time unit;
   wherein the processor is further configured to:
   transmit the target uplink control information in the first time unit.

8. The terminal device according to claim 7, wherein the target uplink shared channel is a scheduled physical uplink shared channel (PUSCH), and/or the target uplink shared channel is a pre-configured PUSCH.

9. The terminal device according to claim 7, wherein before the processor transmits the target uplink control information and the target uplink shared channel in the second time unit, the processor is further configured to:
   receive indication information sent by a network device, wherein the indication information is used to indicate that the terminal device can transmit the target uplink control information in the first time unit, and can transmit the target uplink shared channel in the second time unit;

wherein the indication information is further used to indicate that the terminal device can transmit the target uplink control information in the second time unit; and the indication information is physical layer signaling, and/or the indication information is higher layer signaling.

10. The terminal device according to claim 7, wherein the target uplink control information comprises hybrid automatic repeat request acknowledgement (HARQ-ACK) information.

11. The terminal device according to claim 7, wherein the second time unit comprises at least two time units, and the target uplink control information is located in a last time unit or a penultimate time unit of the at least two time units; and the target uplink control information is carried on the target uplink shared channel.

12. The terminal device according to claim 7, wherein processor is configured to:

transmit a first uplink control channel and the target uplink shared channel in the second time unit, wherein the target uplink control information is carried on the first uplink control channel.

* * * * *